Patented June 13, 1950

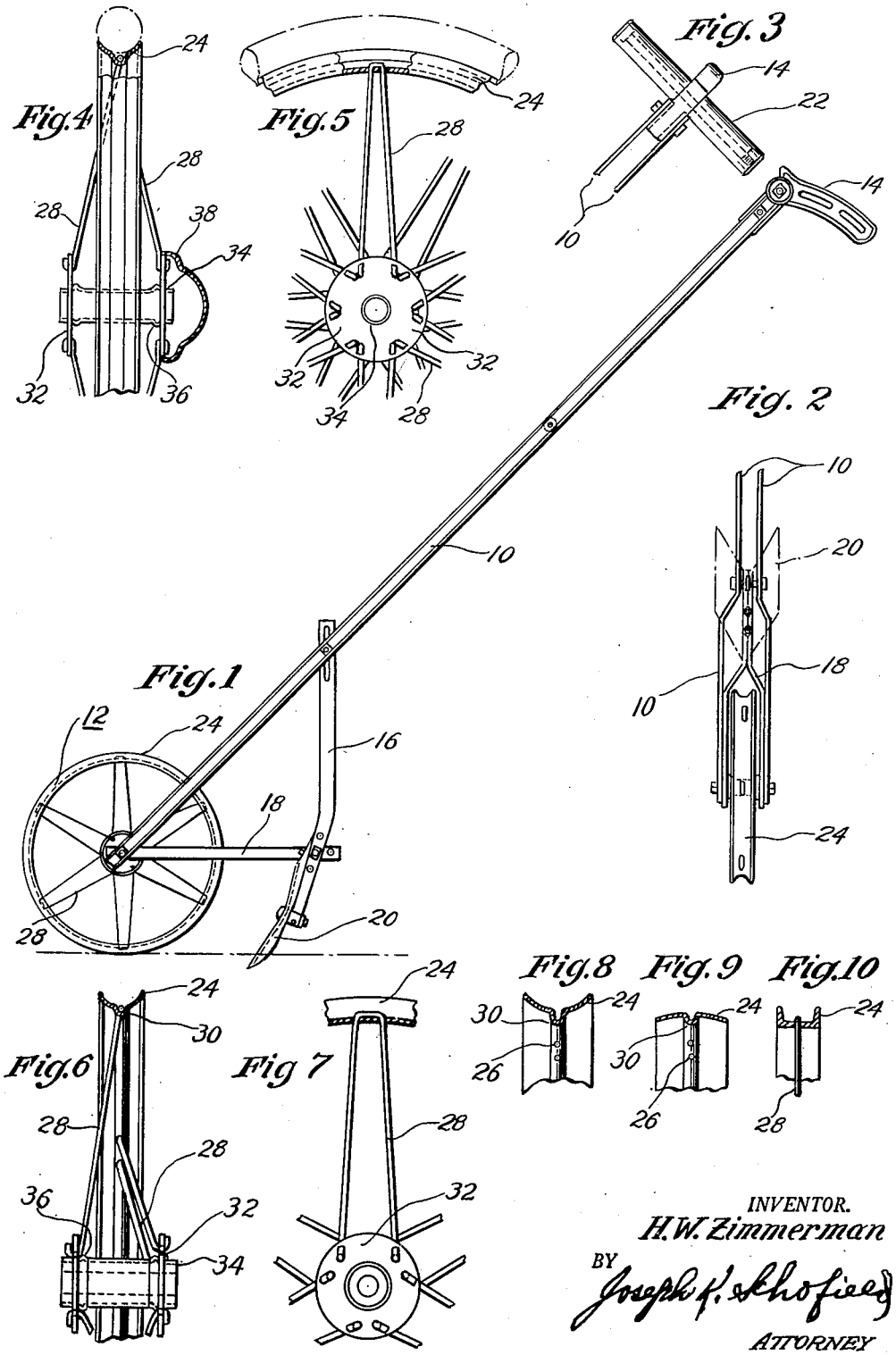

2,511,141

UNITED STATES PATENT OFFICE 2,511,141

WHEEL FOR VEHICLES

Herman W. Zimmerman, North Newington, Conn.; Sylvia V. M. Zimmerman, administratrix of said Herman W. Zimmerman, deceased, assignor of one-third to Sylvia V. M. Zimmerman and two-thirds to Ada Z. Shade, Crystal Lake, Ill.

Application April 2, 1946, Serial No. 659,074

3 Claims. (Cl. 301—57)

This invention relates primarily to wheels and more particularly to a wheel construction adapted for hand cultivators, light vehicles, such as baby carriages, doll carriages, and any vehicle whether provided with a pneumatic or other form of resilient tire.

An object of the invention is to provide a wheel construction that may be made up of preformed or rolled commercial shapes of metal such as steel to form its rim, the hub being preferably made up of standard form including spaced disks and connected to the rim by wire spokes doubled centrally at the rim and having their bent portions extending to and being attached at their ends to the hub.

Another object of the invention is to provide an improved hub structure having laterally spaced disks to which the inner free ends of the doubled spokes are secured.

And finally it is an object of the invention to provide a convenient and simple means to apply tension to the spokes between the rim and hub disks, the hub disks while spaced apart being secured in that position by a sleeve or other member passing axially through the disks.

With the above and other objects in view, my invention is shown and described in a form of hand cultivator.

In the accompanying drawings, I show a preferred form of the wheel construction adapted for application to a hand cultivator.

In the drawing:

Fig. 1 is a complete side elevation of an improved cultivator built in accordance with the present invention and having its wheel also made up in accordance therewith.

Fig. 2 is a plan view of the wheel shown in Fig. 1 and portions of the cultivator frame.

Fig. 3 is a detail plan view of the handle provided for the cultivator frame.

Fig. 4 is an enlarged transverse section of a wheel provided with a special form of tread for the rim and with a hub cap.

Fig. 5 is a side elevation of the wheel shown in Fig. 4.

Figs. 6 and 7 are figures showing views corresponding to Figs. 4 and 5 but illustrating a modified form of construction.

And Figs. 8, 9 and 10 are cross-sectional views showing modified forms of rim shapes.

In the above mentioned drawing there have been shown several embodiments of the invention, the one illustrated being adapted for general vehicle use.

Briefly, and in its preferred aspect, the invention may include the following principal parts: First, a rim of rolled steel of preformed cross section; second, a hub structure comprising spaced disks held in spaced apart position by a tube forming a rotatable bearing for an axle, and third, spokes formed of wire members doubled at their central portion and having their ends extending through the rim and made fast to spaced portions respectively of said hub disks.

Referring more in particular to the figures of the drawing and first to Fig. 1 it will be seen that the cultivator at one end of its frame 10 has a supporting wheel 12 and at the other end of the frame is provided a suitable handle 14. Intermediate the ends of this frame member 10 are supporting arms 16 and 18 for a suitable tool 20, the one shown being a form of trowel. One of the arms 18 for the tool 20 includes two side members attached at one of their ends to the axle of wheel 12. Adjustably attached at its opposite end is the downwardly extending arm 16 to the bottom end of which is rigidly attached the tool 20. Adjustments are provided for these arms 16 and 18 so that the position and angular adjustment of the tool 20 may be widely varied. As the form of tool 20 constitutes no part of the present invention, further description is not thought to be necessary.

The handle 14 at the upper or free end of the frame 10 may comprise a hand fitting casting rigidly secured between the two side arms of the frame 10 as by rivets. In addition thereto a transversely extending handle member 22 may be provided extending on opposite sides of the frame 10 so that this handle 22 may be grasped by both hands of the user. By using the cast or grip handle 14 only, the cultivator may be operated by either hand.

At the lower end of the frame 10 is provided a suitable attachment for a wheel. Preferably the frame 10 may have its side arms spaced far enough apart at this end to rotatably mount the wheel between them.

The wheel 12 forming the principal part of this invention includes a rim 24 formed by a preformed cross section of rolled metal such as strip steel bent into circular form to the desired diameter. The ends of the rolled section after being bent to the proper diameter are secured together as by being butt welded, riveted or otherwise rigidly secured together. At spaced portions of the rim 24 are pairs of adjacent holes 26. These as shown are in the mid-plane of the wheel 12 which in some forms of the invention may have a depression to accommodate the spokes 28.

Extending radially inward from the rim 24 are wire spokes 28 each spoke comprising one end of a doubled length of wire. Adjacent spokes 28 extend through a pair of adjacent holes 26 in the rim 24. The bend of each spoke lies within the channel section 30 of the rim 24 if a channel is provided. In any case the bends are in the central plane of the rim and the free ends of the spokes 28 are attached to the hub members.

The hub structure of the wheel 12 to which the inner ends of the spokes 28 are attached include a pair of disks 32. Alternate pairs of the spokes 28 are attached to the same disk 32 on one side of the hub. Each disk 32 is apertured for receiving these spoke ends by equally spaced holes. These holes may be large enough for but one spoke 28 or if desired the holes may be elongated sufficiently to accommodate a pair of spokes as shown in Fig. 5. The spoke ends after passing through the disks 32 may be bent over or beaded so that they will be rigidly secured to a disk.

The spokes 28 are secured to the disks 32 so that an equal number of pairs of spokes 28 will be attached to each disk. In order to tension the spokes 28 slightly and evenly the disks 32 are held in spaced relation on a tubular member 34. The disks are mounted on the tubular member as indicated in Figs. 2, 4 and 6 after the spokes are applied to the disks. To mount the disks on the tubular member they are first held in spaced apart relation, the tube 34 is passed through the disks and the disks fitted over the ends of the tube while being held in spaced relation thereon by projecting portions 36 of annular or other form provided in spaced relation in said tube. The projecting portions 36 may be formed into the tube 34 while the disks are maintained in spaced relation to permanently position the disks and maintain the desired tension on the spokes 28.

Any suitable rotatable bearing may be provided within the sleeve 34 for supporting the wheel 12 and if desired a hub cap 38 may be fastened over one of the disks. Preferred forms of rim sections are shown in Figs. 8, 9 and 10. In Fig. 8 the rim is so designed that it will accommodate a pneumatic or other form of tire. Fig. 9 shows a crowned form adapted for general use without any form of tire. These two forms of the rim have a rolled groove central of the rim within which the bend of the wire spokes may lie thereby leaving a smooth seat for a tire or for contact with the ground. Fig. 10 shows an efficient form of tread for the cultivator shown in Fig. 1 as its side flanges cause the wheel to travel forwardly with substantial resistance against lateral deviation.

I claim as my invention:

1. A wheel construction comprising a rim, a hub having spaced apart disks, an annular series of holes in said disks, spokes connecting said rim and disks, said spokes comprising centrally bent wires forming pairs of adjacent spokes, the bends extending through the rim and the opposite ends of each bent wire being secured to adjacent portions of the same disk and the ends of alternate pairs of spokes being attached to the same disk, one end each of alternate pairs of spokes entering the same hole in a disk.

2. A wheel construction comprising a rim, a hub having spaced apart disks, an annular series of holes in said disks, spokes connecting said rim and disks, said spokes comprising centrally bent wires, the bends extending through the rims and the ends of each pair of wires being secured to adjacent portions of a disk, the ends of alternate pairs of spokes being attached to the same disk, one end each of alternate pairs of spokes entering the same hole in a disk, a sleeve disposed between said disks, and means thereon holding said disks in spaced apart relation.

3. A wheel construction comprising a rim, a hub having spaced apart disks, an annular series of holes in said disks, spokes connecting spaced portions of said rim with said disks, said spokes comprising centrally bent wire members having their bent portion disposed within the rim and having their opposite ends extending through adjacent openings therein, the free ends of each pair of said wires being secured to one of said disks so that adjacent pairs of spokes will be attached to opposite disks, one end each of alternate pairs of spokes entering the same hole in a disk, and means to retain said disks in spaced relation to uniformly tension said spokes.

HERMAN W. ZIMMERMAN.

REFERENCES CITED

The following references are of record in the file of this patent:

UNITED STATES PATENTS

| Number | Name | Date |
| --- | --- | --- |
| 444,430 | Gedge | Jan. 13, 1891 |
| 502,006 | Messmer | July 25, 1893 |
| 929,650 | Barschow | Aug. 3, 1909 |
| 1,083,682 | Hill | Jan. 6, 1914 |
| 1,153,919 | Hopkins | Sept. 21, 1915 |
| 1,515,153 | Dittmar | Nov. 11, 1924 |
| 2,068,215 | Winters | Jan. 19, 1937 |

FOREIGN PATENTS

| Number | Country | Date |
| --- | --- | --- |
| 260,890 | Great Britain | Nov. 11, 1926 |